United States Patent [19]

van der Kooy

[11] Patent Number: 5,037,690

[45] Date of Patent: Aug. 6, 1991

[54] SHAPED PRODUCT COMPRISING A THERMOSET, FOAMED, PLASTICS SHEET MATERIAL REINFORCED WITH COHERENT NATURAL-FIBRE MATERIAL, AND A PROCESS FOR MAKING THE SHAPED PRODUCT

[75] Inventor: Ijede van der Kooy, Leermens, Netherlands

[73] Assignee: De Groot Automotives, B.V., Hoogzand, Netherlands

[21] Appl. No.: 276,956

[22] Filed: Nov. 28, 1988

[30] Foreign Application Priority Data

Nov. 27, 1987 [NL] Netherlands ............. 8702854
Jan. 25, 1988 [NL] Netherlands ............. 8800159

[51] Int. Cl.$^5$ ................................. B32B 3/12
[52] U.S. Cl. .................. 428/116; 264/239; 264/258; 428/280; 428/282; 428/284; 428/300; 428/308.4; 428/317.9; 428/423.1; 428/425.1; 428/911
[58] Field of Search ............ 428/425.1, 280, 289, 428/290, 911, 284, 300, 902, 282, 116, 423.1, 118, 308.4, 317.9; 264/239, 258

[56] References Cited

U.S. PATENT DOCUMENTS 4,182,649  1/1980  Isgur et al. ................. 428/248
4,954,382  9/1990  Riefler ....................... 428/116

Primary Examiner—James J. Bell
Attorney, Agent, or Firm—Cooper & Dunham

[57] ABSTRACT

The invention provides a novel shaped product comprising a sheet material of polyurethane resin material reinforced with binder-free natural-fibre material, such as jute, flax, hemp, coir, ampas, ramie or cotton, possibly combined with polypropylene, polyethylene and/or glass fibres. A preferred fibre material is jute, preferably in the form of jute needled felt. The invention also provides a process for making the product. In the process, a binder-free mat of natural-fibre material having a water content of at least 4% which is impregnated with a known per se mixture thermosettable to form a polyurethane material, comprising a polyether-polyol component and an isocyanate component, followed by maintaining the temperature of the mixture at 20°–50° C., and setting the impregnated fibrous mat in a closed mold at a pressure of 3.5–20 kg/cm$^2$ and a temperature of 20°–75° C.

14 Claims, No Drawings

SHAPED PRODUCT COMPRISING A THERMOSET, FOAMED, PLASTICS SHEET MATERIAL REINFORCED WITH COHERENT NATURAL-FIBRE MATERIAL, AND A PROCESS FOR MAKING THE SHAPED PRODUCT

This invention relates to a shaped product comprising a thermoset, synthetic plastics sheet material reinforced with coherent natural-fibre material.

A similar product and a method of making it are disclosed in DE-A-3150906. That application relates to the use of a plastics sheet material reinforced with coir, cotton or jute fibre webbing, using as the plastics material a thermosetting polyester resin. The polyester resin has a foam structure, obtained by adding a foaming agent, for example, an azide or a carbonate to the polyester material prior to using it. The known shaped products can be used in the construction of vehicles for use on land, at sea or in the air.

When polyester is processed, styrene is released, which is objectionable from the point of view of environmental pollution. Accordingly, provisions should be made for this, which involve a considerable expense, certainly when the MAC value of styrene (i.e., the maximum acceptable concentration, stated in ppm=parts per million) will be drastically decreased in the near future. Furthermore, the manufacturing process in which polyester resin material is used requires relatively much energy: to achieve economic production, process temperatures of 130°-220° C. are maintained.

It is an object of the present invention to provide a shaped product of the above kind, which can be obtained through a simplified procedure, is environmentally friendly and can be processed, and which, by using the properties of the natural-fibre material and of the plastics material, can lead to material combinations having particular properties.

The present invention is characterized in that the plastics sheet material is a combination of polyurethane resin material reinforced with binder-free natural-fibre material.

According to the invention, a binder-free natural-fibre material is used to exclude a possible interfering effect of a binder.

A plastic material according to the invention can be processed to form a composite product, for example, a sandwich panel comprising a core layer firmly bonded on both sides with a plastics sheet material according to the invention. Such a sandwich panel may be a flat product or one that is profiled to a greater or lesser extent, for example, corrugated or curved.

The core layer may include a lattice or honey-comb structure, a full-layer structure or a highly profiled structure.

If the core layer is a lattice or honey-comb structure, it may be made of a material such as, for example, paper, cardboard, aramide, Kevlar, polystyrene, polycarbonate.

In the case of a core layer with a full-layer structure, the layer may be formed of, for example, a foam layer of polyurethane, polystyrene or polyvinyl chloride. In the case of a polyurethane foam layer as the core layer, it may be filled, for example, with glass fibres or expanded clay granules, or the core layer may consist of balsa wood or a mineral filling material as, for example rock wool or ceramic fibre material.

If the core layer is a profiled material, it may be formed, for example, of corrugated cardboard, ABS, GVK, polypropylene, polystyrene, Kevlar, aramide. It is also possible to use a profiled core layer obtained from a parallel arrangement of substantially contacting tubes of polyvinyl chloride, polystyrene or polypropylene.

A product according to this invention may have the form of a flat sheet, as such, but also, for example, of a specifically shaped product substantially made of the plastics sheet according to the invention, such as a self-supporting interior part, for example, a door panel, of an automobile. Within the world of building, too, there are many uses for such an embodiment of the plastics sheet according to this invention. As regards the sandwich panels, the following examples of uses may be mentioned:

Stand construction (exhibitions)
At present, heavy panels are used for this purpose (15-30 kg/m²).
The panel according to this invention has a mass of 3-5 kg/m².
Building industry.
Examples are doors, roof panels, partitions, floor plates, insulation panels.
Project building.
Use as store shelves, counters and the like.
Furniture industry.
Couches, beds.

The invention also relates to a method of making a shaped product, comprising a thermoset plastics sheet material reinforced with coherent natural-fibre material, which comprises impregnating a fibrous mat with a reaction mixture thermosettable to form said plastic; transferring the impregnated fibrous mat to a mold and maintaining it therein at elevated temperature and pressure; and removing the resulting shaped product from the mold, which method is characterized in that a binder-free fibrous mat of natural-fibre material and with a water content of at least 4% is impregnated with a mixture thermosettable to a polyurethane material, said mixture including a polyether-polyol component and an isocyanate component, as known per se, maintaining the temperature of the mixture at 20°-50° C., and setting the impregnated fibrous mat in the mold at a pressure of 3.5-20 kg/cm³ and a temperature of 20°-75° C.

Preferably the water content of the natural-fibre material is 4-20%.

In accordance with a further elaboration of the method according to this invention, the percentage of resin of the impregnated fibrous mat is 35-70% by weight.

The polyether-polyol component and the isocyanate component from the mixture settable to form the polyurethane resin material, with which the fibrous mat is impregnated, react directly with each other after being mixed in accordance with the polyaddition principle, the basic reaction of which reads as follows:

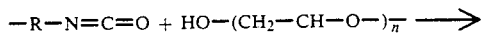

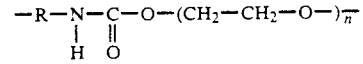

This reaction may, if desired, be accelerated with specific catalysts, which are added to the polyol, if desired with other required adjuvants, such as surfactants and flame retarders.

From thepolyurethane chemistry, it is known that the isocyanate component is capable of reacting with water according to the following reaction equation:

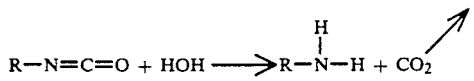

The present invention is based upon the idea, based on the reaction of isocyanate with water, to make good use of the water naturally available in natural-fibre materials, the content of which is at least 4%, to produce a polyurethane resin material which exhibits a foaming effect as a result of the carbon dioxide gas released during the reaction of the isocyanate component with the water. It has now been found that the product obtained by the method according to the invention has a certain porosity. This porosity can be controlled to a certain extent by varying the proportion of isocyanate in the mixture. The porosity caused during the process according to the invention also results in a product having properties which are attractive for the application thereof, i.e., a good shock absorption and a low specific gravity of 700–850 kg/m$^3$.

By virtue of the above foaming effect, the invention relates to the following fibre materials, which all have a certain moisture content: Jute, flax, hemp, coir, ampas, ramie and cotton, as well as the combinations of these with polypropylene, polyethylene and glass fibres, provided the minimum moisture content is ensured. The preferred form of the natural-fibre material is jute needled felt. This material is cheap and available as a standard material, while owing to the nature of the felting process (web formation followed by needling), there is a certain bond between the fibres without the presence of interfering binders. Depending on the application of the fibre-reinforced material, fibres or combinations thereof suitable for such purpose can be selected.

One advantage of a polyurethane is that, owing to the nature of the chemical reaction, the components react fully. Moreover, no solvents are present, and no harmful substances or smells are released. It is true that the isocyanate component by itself is aggressive to eyes, skin and respiratory organs, but owing to the low vapor pressure, the MAC value of 0.02 ppm will not soon be exceeded. The polyol component consists of non-volatile compounds, which are not dangerous during normal treatment.

The polyurethane material reinforced with natural-fibre material according to the invention has a good impact resistance, which is caused, among other reasons, by the tough character of the polyurethane and the good fibre-polyurethane bond.

Owing to the many possibilities of the polyurethane chemistry, the properties of the material are adjustable within reasonable limits when the same raw materials are used.

The procedure in the process according to the invention is simple and comprises the following stages:
 a. Preparatory work,
 b. Wetting or impregnating the fibres,
 c. Molding and pressing, and possibly,
 d. The after-treatment.

Among the preparatory work is the punching or cutting of the coherent natural-fibre material, for example, jute needled felt, to crude peripheral shapes. In this way, practically the only waste material is jute waste, because no resin is applied to excess jute, and resin wastes remain limited. For certain uses (for example, flat sheet materials), the above treatment can be done without.

The resin is made up in accordance with the desired formulation. The addition of 0.1 to 3% of catalyst and 0.1 to 3% of surfactant to the polyol component takes place with quiet stirring to prevent the introduction of air, and hence moisture, as much as possible.

For the impregnation of the jute fibre mat provided, the mixture comprising the polyether-polyol component and the isocyanate component is applied to the jute felt mat with a high-pressure two-components machine by the so-called "airless-spray" method.

Depending on product requirements, the percentage of resin can range from 35 to 70%. By means of a robot or manipulator system, impregnation can be accurately carried out.

By adjusting the process parameters, the mechanical properties can be influenced within certain limits.

For example, the temperature of the resin is adjusted by means of a heat exchanger. In accordance with the present invention, this temperature is 20°–50° C. This operating temperature, as well as the amount of catalyst determine the interval between impregnation and pressing.

After the impregnation of the felt mat, it is transferred to a mold placed in a press. The mold has been pre-treated with a release agent to prevent "sticking" of the product, and thereby to shorten the demolding time.

As soon as the mat is within the mold, the latter is closed, and the setting reaction can be fully continued. According to the invention, a temperature of 20°–75° C is maintained during molding.

Unlike, for example, molding compounds of polyester and phenol resins, the pressure can be kept at a low value. Depending on the desired material, the pressure according to the present invention is 3.5–20 kg/cm$^3$. The period of pressing depends on the initial temperature of the components, catalyst concentration, mold temperature and thickness of the product.

After completion of the setting process, the product can be released and is ready for any after-treatment.

The after-treatment may include painting the product or coating it with a plastics film.

Owing to its porosity, the product has a certain air permeability. This makes it possible for the product to be coated with a plastics film or other air-tight coating material using vacuum equipment.

According to a further elaboration of the process according to this invention, the procedure is such that two of the impregnated fibrous mats with a core layer between them are joined to form a laminate composite, whereafter the composite is set in the mold. In this embodiment of the process according to the invention it may be desirable to cut both the fibrous mats and the core layer, which may be made of one of the types of structure and/or materials specified hereinbefore, to the desired size.

As compared with the process according to the present invention, known sandwich panels are generally so made that ready outer sheets are unilaterally provided with a layer of adhesive whereafter the core layer is glued between and with these outer sheets Although this prior process can be effected both continuously and discontinuously, it is clear that it is always necessary first to make the outer sheets before proceeding to glue these sheets to the core layer.

As compared with the prior process, in the process according to the present invention a sandwich panel is made in an integrated manner, that is to say, the outer sheets are formed as the sandwich panel is formed. One advantage of the process according to the invention as compared with the prior process is therefore that one process stage is saved, while a further advantage is that no adhesive material needs to be used, because use is made of the excellent bonding characteristics of polyurethane with a multiplicity of materials.

Moreover, in the prior manufacture of a sandwich panel using a honey-comb structure as a core layer, the adhesive is commonly applied to the outer sheets. The effective adhesive area or bonding area is therefore determined by the cross-sectional area of the material of the honey-comb. By combining the impregnated fibrous mat with the honey-comb and subsequently allowing this packet to set at the pressure and temperature to be used in the method according to the invention, a sandwich panel with an excellent bond between the outer sheets and the core layer is obtained. This good bond is caused by the foam effect of the polyurethane, as a result of which the polyurethane bonds not only to the material surface of the cross-section, but also to the inner and outer sides of the raised edges of the honey-comb structure.

The process according to the invention can also be carried out both continuously and discontinuously. In the case of a continuous embodiment, the mold plates are technically adapted, for example, formed as endless belts of steel. The principle of the impregnation technique remains substantially the same, albeit that in the continuous embodiment the coherent natural-fibre material, for example jute, is processed from a roll thereof.

In the process according to the invention, a suitable mixture thermosettable to polyurethane may in addition to the polyol component and the isocyanate component comprise 0.1-3% by weight of catalyst of the type of DBTL (dibutyl tin laureate), Fox-o-cat (tradename, given by Resina Chemie, of Foxhol, the Netherlands) or Dabco, and 0.1-3% by weight of a surfactant.

In the preparation of polyurethane resins, the art mainly uses raw materials having bi-functional or poly-functional hydroxyl groups, for example, or polyethers having terminal hydroxyl groups capable of reacting with bi-functional or poly-functional isocyanates. In the framework of the process according to the present invention, use is made of polyether-polyols. The functionality, that is to say, the number of reactive hydroxyl groups, is in this case 3 or more to obtain ultimately a three-dimensionally branched, thermoset, polyurethane material having good mechanical properties such as impact resistance and bending strength. Examples of such polyols are of the type commercially available under the names of Resicast, Desmophen, Fox-o-pol, Elastophen, Rutapur.

The isocyanate component preferably used in the process according to the invention is an aromatic isocyanate, for example, TDI and MDI (toluene-diisocyanate (2,6) and methylene-diphenyldiisocyanate (4,4)). Isocyanates of such a type are commercially available under the names of Urestyl, Desmodur, Elastan, Baymidur.

I claim:

1. A sandwich panel comprising a core layer firmly bonded on opposite sides to thermoset polyurethane resin sheet material reinforced with cohesive natural fiber material, said sandwich panel having been obtained by combining two sheets of cohesive natural fiber material impregnated with polyurethane resin with said core layer positioned between said sheets to form a laminate and thermosetting said laminate in a mold to produce said sandwich panel.

2. A sandwich panel in accordance with claim 1 wherein said cohesive natural fiber material contains at least 4% water.

3. A sandwich panel in accordance with claim 1 wherein said core layer is a honeycomb structure.

4. A sandwich panel in accordance with claim 1 wherein said natural fiber material is selected from the group consisting of jute, flax, hemp, coir, ampas, ramie or cotton.

5. A sandwich panel in accordance with claim 4 wherein said natural fiber material is combined with synthetic fiber material selected from the group consisting of polypropylene fiber, polyethylene fiber or glass fiber.

6. A sandwich panel in accordance with claim 4 wherein said natural fiber material is jute.

7. A sandwich panel in accordance with claim 6 wherein said jute is jute needled felt.

8. A process for producing a sandwich panel which comprises impregnating two mats of cohesive natural fiber material having a water content of at least 4% with a reaction mixture thermosettable to polyurethane comprising a polyether-polyol and an isocyanate component, said mats being impregnated with said reaction mixture at a temperature in the range about 20°-50° C., combining the resulting impregnated fibrous mats with a core layer positioned between the impregnated fibrous mats to form a resulting laminate composite, subjecting the composite in a mold to a temperature in the range 20°-75° C. and a pressure in the range 3.5-20 kg/cm$^2$ to effect setting of the polyurethane material and removing the resulting produced sandwich panel from the mold.

9. A process in accordance with claim 8 wherein the water content of said natural fiber material is in the range about 4-20%.

10. A process in accordance with claim 8 wherein the natural fiber material is selected from the group consisting of jute, flax, hemp, coir, ampas, ramie and cotton.

11. A process in accordance with claim 10 wherein said fiber material is combined with synthetic fiber material selected from the group consisting of polypropylene fiber, polyethylene fiber and glass fiber.

12. A process in accordance with claim 10 wherein said natural fiber material is jute.

13. A process in accordance with claim 12 wherein the jute is in the form of jute needled felt.

14. A process in accordance with claim 8 wherein the amount of polyurethane material in the fibrous mats is about 35-70% by weight.

* * * * *